US008178182B2

(12) United States Patent
Spandern

(10) Patent No.: US 8,178,182 B2
(45) Date of Patent: *May 15, 2012

(54) MULTILAYERED CLUTCH LINING AND METHOD FOR PRODUCTION OF A MULTILAYERED CLUTCH LINING

(75) Inventor: Christian Spandern, Elkenroth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 257 days.

This patent is subject to a terminal disclaimer.

(21) Appl. No.: 12/288,457

(22) Filed: Oct. 21, 2008

(65) Prior Publication Data

US 2009/0053502 A1    Feb. 26, 2009

Related U.S. Application Data

(63) Continuation of application No. PCT/DE2007/000625, filed on Apr. 10, 2007.

(30) Foreign Application Priority Data

Apr. 21, 2006  (DE) .......................... 10 2006 018 700

(51) Int. Cl.
*B32B 3/02* (2006.01)
*B29B 7/00* (2006.01)
*F16D 65/12* (2006.01)
*F16D 69/00* (2006.01)
*B29C 70/86* (2006.01)

(52) U.S. Cl. ............ 428/66.2; 188/218 XL; 188/251 M; 192/30 R; 192/107 M; 192/18 A; 428/292.1; 428/542.8; 156/172; 156/184; 156/92

(58) Field of Classification Search .................... 428/37, 428/65, 65.9, 66, 260, 281–283, 286, 287, 428/288, 290, 292.1, 300, 36.1, 66.2, 542.8; 192/107 M, 113.23, 105 C, 17 R, 30 R, 18 A; 427/299, 191; 442/147, 148, 164; 188/251 A, 188/251 M, 218 XL, 218 A; 156/180, 172, 156/184, 92
See application file for complete search history.

(56) References Cited

U.S. PATENT DOCUMENTS

| 3,365,041 | A | * | 1/1968 | Stormfeltz | ............... | 192/107 M |
| 4,244,944 | A | | 1/1981 | Wilkinson | | |
| 4,384,640 | A | | 5/1983 | Trainor et al. | | |
| 5,601,174 | A | | 2/1997 | Schulz | | |
| 6,648,114 | B2 | * | 11/2003 | Bornhorst et al. | ........... | 192/18 A |
| 7,854,303 | B2 | * | 12/2010 | Spandern et al. | ........ | 188/251 M |
| 7,954,608 | B2 | * | 6/2011 | Spandern et al. | ....... | 188/218 XL |

FOREIGN PATENT DOCUMENTS

DE            3804898 C2      9/1988
(Continued)

*Primary Examiner* — Elizabeth Cole
*Assistant Examiner* — Altrev Sykes
(74) *Attorney, Agent, or Firm* — Simpson & Simpson, PLLC

(57) ABSTRACT

A multilayered friction lining, including friction member (4, 4a) that forms a friction surface; and reinforcement member (3, 3a). Reinforcement member (3, 3a) is wound of reinforcement yarn and friction member (4, 4a) is wound of friction yarn. The friction yarn features friction and/or anti-wear properties better than of the reinforcement yarn, the friction member (4, 4a) is wound with a friction coil-winding ratio and the reinforcement member (3, 3a) is wound with a reinforcement coil-winding ratio, and the friction coil-winding ratio is greater than or equal to said reinforcement coil-winding ratio.

21 Claims, 3 Drawing Sheets

FOREIGN PATENT DOCUMENTS

| | | |
|---|---|---|
| DE | 4018671 C2 | 12/1990 |
| DE | 4420291 B4 | 5/1995 |
| DE | 4414058 A1 | 10/1995 |
| DE | 102004038773 A1 | 3/2005 |
| GB | 1250149 | 10/1971 |
| GB | 2002466 A | 2/1979 |
| GB | 2056369 A | 3/1981 |
| GB | 2269640 A | 2/1994 |

* cited by examiner

MULTILAYERED CLUTCH LINING AND METHOD FOR PRODUCTION OF A MULTILAYERED CLUTCH LINING

CROSS REFERENCE TO RELATED APPLICATIONS

This application is filed under 35 U.S.C. §120 and §365(c) as a continuation of International Patent Application PCT/DE2007/000625, filed Apr. 10, 2007, which application claims priority from German Patent Application No. 10 2006 018 700.8, filed Apr. 21, 2006, which applications are incorporated herein by reference in their entirety.

FIELD OF THE INVENTION

The invention relates to a multilayered friction lining, for example, layered clutch lining.

A further aspect of the invention relates to a method for producing such a clutch lining.

BACKGROUND OF THE INVENTION

Clutch linings are used for friction clutches in motor vehicles, where they are riveted on either a metallic clutch plate or clutch disc, so that, in connection with a counterpart element, in the connected state, power is transmitted from an engine to a transmission unit or disconnected when the clutch is open.

At the same time, high demands are put on clutch linings since they are expected to fulfill several functions that are not easily achievable in a specific manner. A clutch lining should feature a high bursting speed in order for it not to be destroyed by centrifugal forces; it should have a high coefficient of friction with which a large torque can be transmitted, and at the same time, it must be resistant to both anti-wear and deformation under thermal and/or power influences. Nevertheless, clutch linings should be as simple as possible and thus economically viable for production.

To increase the bursting strength, and thus the clutch lining strength in circumferential direction, it is already prior art to lay impregnated extruded material with binder in wavy circumferential direction, in several shallow layers. Coils of the extruded material feature radial, inner and outer reversal areas that lie on concentric circles (German Patent DE 44 20 291 B4). The reversal areas of the coils can be distributed on several concentric circles with different diameters respectively. The radii of the circles differ sufficiently in order to prevent thickened spots along the edges of clutch lining or lining body that can lead to pressure damages on the extruded material. By this means, the proportion of the extruded material can be increased in the overall composition of the lining body material.

It is already known to configure clutch linings or friction clutch linings in two layers that comprise a base member or a reinforcement member and a facing member or a friction member to absorb bursting forces on the base member. The base member is preferably reinforced, whilst the other member (possibly non-reinforced) preferably provides the desired frictional properties (German Patent DE 44 14 058 A1, U.S. Pat. No. 5,601,174). The facing member of the friction lining simultaneously forms an abrasive layer whilst the base member essentially exercises a supporting or holding function, for which it should be rigid. However, the top layer is not optimized against deformation.

In a different, double-layered friction lining that includes a friction member and a reinforcement member, the proportion by volume between glass fibers and polyamide fibers in the friction member differs from the proportion by volume of different fibers in the reinforcement member (U.S. Pat. No. 4,244,944). Warpage or deformation of the friction lining can occur as result of this, owing to different expansion coefficients of glass and polyamide fibers.

To solve the aforementioned problems, a double-layered clutch lining from a compression-molded resin friction member is already known. This forms a friction surface and a reinforcement member in which the compression-molded friction member essentially comprises a matrix that consists of glass fibers and aromatic polyamide fibers, and furthermore consists of inorganic filler, a solid lubricant and binder resin (German Patent DE 38 04 898 C2). The reinforcement member essentially features a matrix that is selected from glass strand or glass yarn. And at least strand or yarn that is selected from a group comprising a synthetic strand or glass yarn and aromatic polyamide strand or glass yarn, wherein a binder adheres to the matrix and the strand or yarns are formed in a spiral shape. The aforementioned strand or yarns depict strands of the so-called endless fibers or filaments with corresponding length. The strength of double-layered clutch lining should be raised by the reinforcement member wound in a spiral-shape. A friction surface with a heat-resistant protective layer should be achieved with the glass fibers contained in the composition of the matrix of the compression-molded friction member. The strength of glass fiber can certainly reduce significantly when the operating temperature of the clutch lining attains the softening temperature, the reason why this does not show very good anti-wear characteristics.

In order to provide a similar, known multilayered clutch lining having improved friction and anti-wear characteristics at high temperature, the compression-molded friction member should essentially comprise a matrix with certain volume fraction of glass fiber. It further comprises at least one type of heat-resistant organic fibers from a group that comprises polyamide fibers, aromatic polyamide fibers and polybenzimidazole fibers. Furthermore it comprises at least one type of heat-resistant inorganic fibers from one group that comprises potassium titanate fibers, ceramic fibers, quartz fibers and glass-type silicon dioxide fibers; it should furthermore consist of inorganic filler, a solid lubricant and binder resin (German Patent DE 40 18 671 C2). The corresponding reinforcement member should essentially be a matrix comprising glass strand or glass yarn and heat resistant organic strand or yarn, and binder comprising resin and unvulcanized rubber that adhere to the matrix, wherein the matrix is formed in a spirally wound shape.

BRIEF SUMMARY OF THE INVENTION

The object of the present invention is to provide a multilayered, for example, double-layered clutch lining with regard to the technical properties described supra, for example, of less deformation under load. Nonetheless, the clutch lining with these properties should be simple and thus viable for economical production.

Thus, the object in question is met for a multilayered, for example, double-layered clutch lining.

In accordance with the invention a multilayered friction lining, for example, double-layered clutch lining is proposed, which features a friction member (4, 4a), that forms a friction surface, and a reinforcement member (3, 3a). The reinforcement member (3, 3a) is made of wound reinforcement yarn and the friction member is made of wound friction yarn. The friction yarn features friction and/or abrasion properties better than the reinforcement yarn. The friction member is wound with a friction coil-winding ratio and the reinforcement member with a reinforcement coil-winding ratio. The friction coil-winding ratio is greater than or equal to the reinforcement coil-winding ratio.

The coil-winding ratio also defines how often the yarn makes a tangent with an imaginary circle with a nominal outside diameter equal to that of the ring-shaped friction member or of a similarly shaped reinforcement member, or it defines how often the yarn makes a tangent with the outside diameter in one revolution of a ring-shaped member otherwise expressed.

The selected yarn or composite yarn exhibits better tribological properties to the friction member than the properties of the yarn selected for the reinforcement member, which, on its part, is more resistant to bursting under high speed than the friction yarn.

In order to optimize the unequal coil-winding ratios for the friction member coils and of the reinforcement member, in one embodiment, a range of coil-winding ratios between 0.2 and 6.0 is used.

To optimize the coils, it has been established that, in one embodiment, the coil-winding ratios of the friction and reinforcement members can be optimized in two separate ranges (referred to as the first and second ratios below) and in one comprehensive range (referred to as the third ratio below) as well.

In one embodiment, for the friction member, the coil-winding ratio ranges from 4.5 to 5.0, with a preferred value of 4.72 and the second ratio ranges from 2.2 to 3.0 with a preferred value of 2.6, and the third ratio ranges from 2.2 to 6.0 with a preferred value of 4.7.

In one embodiment, for the reinforcement member, the first ratio ranges with values from 1.0 to 1.5, with a preferred value of 1.12 and the second ratio ranges from 2.2 to 3.0 with a preferred value of 2.6, and the third ratio ranges from 0.2 to 5.2 with a preferred value of 4.7.

Before the coils of the reinforcement member and friction member are wound in the specified wavy shape manner, the yarns selected for this purpose are impregnated with a standard solution that is convenient for production, in which a binding resin, an elastomer and a filler are dispersed. After drying the impregnating yarns, prior to winding and subsequent hot pressing, the non-volatile components of the impregnation solution form a composite with the coils. Thorough mixing occurs along a parting plane that ensures reliable connection of the two clutch layers.

Not only is a balanced compromise made of all common technical properties demanded for a clutch lining, but also further degrees of freedom are optimally used, which enable a present invention clutch lining to be made from two functional sections. In this regard, an underlayer, thus reinforcement member, of the clutch lining forms the basis for dimensional stability and strength, and is optimized as such. The top layer (overlayer) facing a friction member or the friction member is optimized tribologically with regard to anti-wear and friction coefficient characteristics. The strength and anti-wear characteristic is decisively influenced by the types of fiber that is used. Top and base designs, or friction and reinforcement members, differ as such in fiber structure and yarn types, for example. The same binder is used with the same filler. Intermixing along a parting plane between the reinforcement member and friction member is deliberately used in order to ensure optimum connection. By this means, superior strength values are attained even after long-lasting and high thermal load, whilst retaining very good tribological properties.

Owing to intermixing of partial volumes of the same binder and the same filler, on the one hand of the reinforcement member and on the other hand of the friction member, along a parting plane, the multilayered clutch lining, for example, double layered clutch lining, forms a solid unit and is thus a composite. Winding takes place according to the manufacturing process defined further below, that it, the winding is done on the coil of the reinforcement member that is on the coil of the friction member. If one end of the reinforcement yarn is wound from the reinforcement member and lies near one of the beginnings of the friction yarn from which the friction member is wound, the end of the reinforcement yarn and the beginning of the friction yarn can essentially lie within a specific plane. Thus, the plane is the parting plane that actually depicts partial volumes of the clutch lining. By this means, the two coils are produced with one winding machine in a manner that is convenient for production.

As alternative, it is also possible that an end of the reinforcement yarn and a beginning of the friction yarn, in production terms, are uncritically located outside the prescribed plane, thus the parting plane.

The steps of manufacturing the multilayered clutch lining includes winding the friction member coils in a wavy shape. This is done from a selected friction yarn that, for example, has tribological properties and glass content, or which is entirely made of glass, according to a friction coil-winding ratio. This is done on the reinforcement member coils according to a reinforcement coil-winding ratio and from a reinforcement yarn that, for example, results in a high bursting speed characteristic. Prior to the winding process, the yarns of both coils are impregnated with standard solution and subsequently dried so that the coiled length consisting of both coils is subjected under pressure with time and temperature regulation. Then, the yarns are cured for several hours at 200° C. to 300° C. and are finally ground and drilled to make the double-layered clutch lining. In the double-layered clutch lining, both the friction member and the reinforcement member have coils individually optimized with respect to the aforementioned special aspects.

Further advantageous features of the process for manufacturing the clutch lining arise from the composition of the clutch lining or from the coils from which the clutch lining is made of:

In one embodiment, for the manufacture of the friction member or of its coil, for which yarn is used, which is optimized for the coefficient of friction and anti-wear properties, a knitted yarn consisting of aramide fiber, glass staple fiber, viscose fiber, PAN fiber and brass wire is used.

In one embodiment, such an optimized friction member yarn is a filament mixture yarn, comprising glass filament and metal wires.

In one embodiment, the yarns described supra are used for the friction member as a combination.

In contrast to this are yarns for the reinforcement member preferably of compound filament types that are optimized for the bursting speed. The filaments are purposefully used in textured form in order to increase their absorbency for an impregnating process.

For the reinforcement member, textured glass/copper yarn is used as a composite filament yarn in one embodiment.

As aforementioned, both the yarns for the friction member as well as those for the reinforcement member are drawn through an impregnating solution respectively prior to winding their coils. The same impregnating solution is used for both the friction and reinforcement members for manufacturing convenience. This has also the advantage that during subsequent hot-pressing process after winding the coils from dried yarns to form winding lengths, the individual layers or parts of each coil do not blend into each other and hence constant quality of the lining is guaranteed up to the end of their service life.

The impregnating solution is a dispersion that, besides water as solvent, contains at least a component from the phenol resin group, melamine resin, polyester as binding resin or thermosetting plastic components, and furthermore contains SBR or NBR unvulcanized rubber as elastomer and at least features a filler from the group comprising barium sulfite, porcelain clay, soot, metal sulfide, graphite.

To manufacture the friction member and reinforcement member coils, the yarns selected for winding are drawn through the impregnating solution and brought to a constant weight ratio of yarn to impregnating solution. Finally, the yarns are dried.

First, the reinforcement member coil for bursting speed optimization is wound from yarn that is selected, impregnated and dried. In the following step, the yarn for the optimization of the coefficient of friction and anti-wear properties is selected for the friction member and then wound on the reinforcement member, wherein the coil-winding ratios of the wavy coils are set for the friction and reinforcement members respectively. It is then optimized for deformation on the one hand and for bursting speed on the other hand. In this regard, the ranges of the coil-winding ratio for the friction member has been established to be convenient from 4.5 to 5.0 and from 2.2 to 3.0, as well as from 2.2 to 6.0 and the coil-winding ratio ranges for the reinforcement member from 1.01 to 1.5 and from 2.2 to 3.0, as well as from 0.2 to 5.2. As the coil-winding ratio for the friction member, 4.72 and 2.6, as well as 4.7 and as the coil-winding ratio for the reinforcement member 1.12 and 2.6, as well as 4.7 are used in one embodiment.

The manufactured coil lengths are pressed together in time and temperature controlled manner and finally cured for several hours at 200° C. to 300° C. To avoid confusion of the friction and reinforcement members during the hot-pressing process, one of the parts, particularly the reinforcement member, can provided with a color mark.

After hot pressing and curing, the linings are ground and drilled according to the fitting requirements.

Further advantages and advantageous embodiments of the invention are subject of the following figures and of the description as well.

Exemplary embodiments are depicted in the drawing with four figures, particularly examples of winding patterns of coils for the friction and reinforcement members, which combined form the double-layered clutch lining coil according to the invention and a clutch disc with two such clutch linings. The following are depicted in the drawings.

Figure 3:
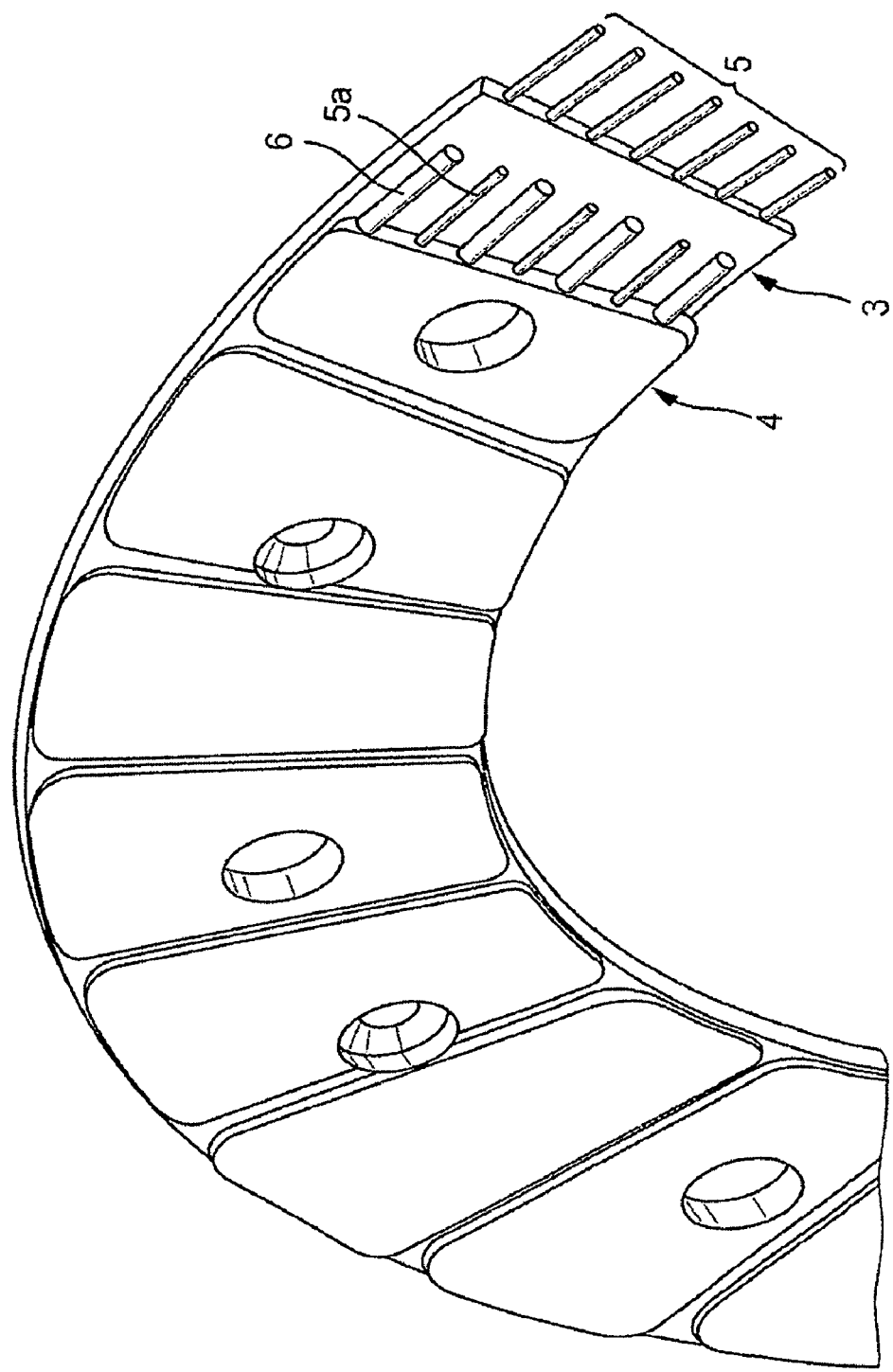
Figure 4:
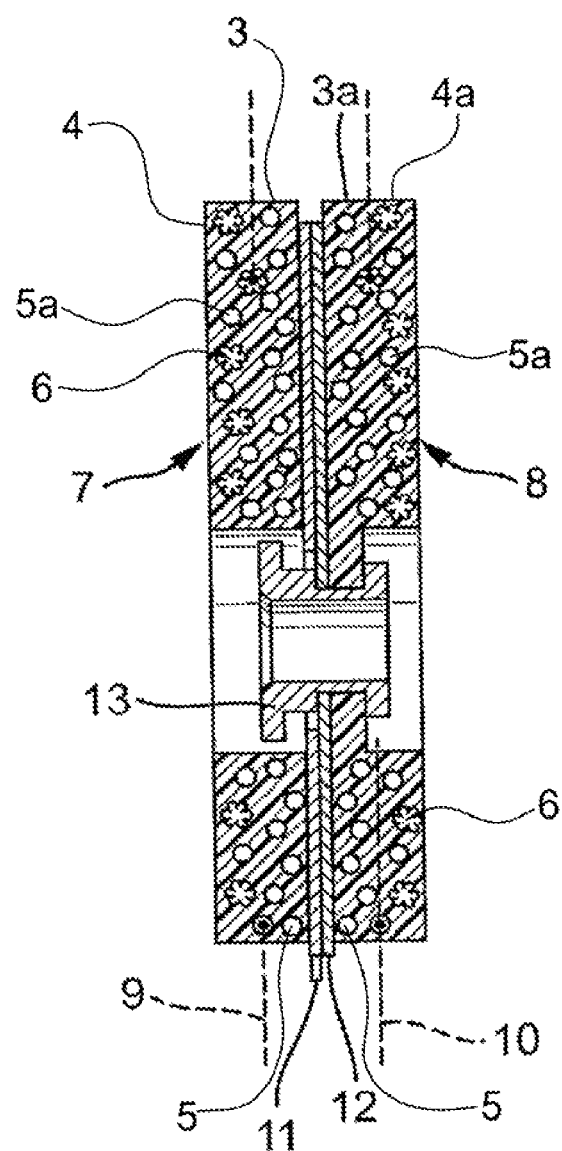

FIG. 3 in a diagrammatic illustration showing a segment cutout from a double-layered clutch lining according to the invention, which comprises a reinforcement member and a friction member; and FIG. 4 shows a longitudinal section through a clutch disc, which is composed of two essentially similar double-layered clutch linings.

Figure 1:
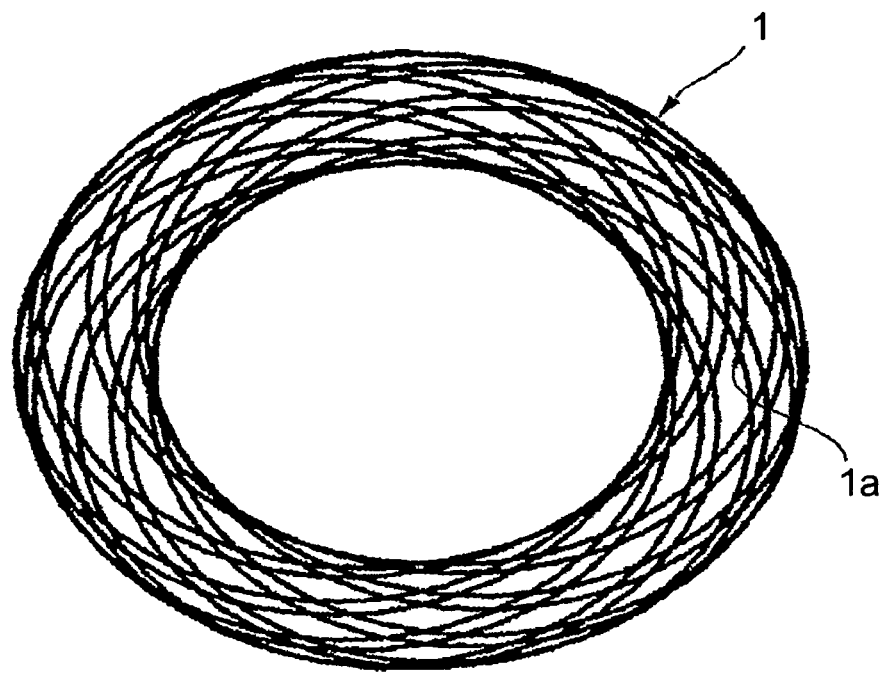
FIG. 1 shows a winding pattern of a wavy coil of the reinforcement member.
Figure 2:
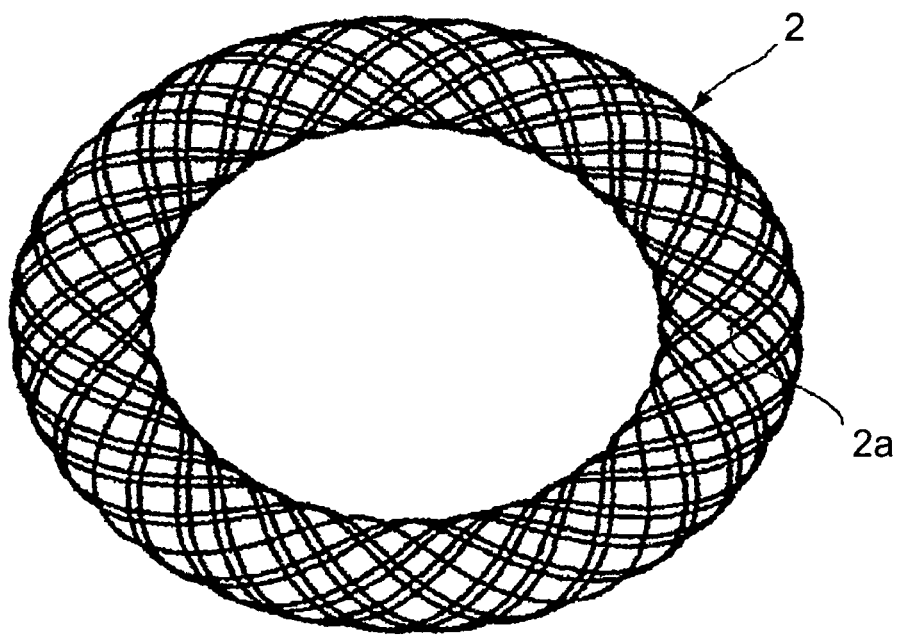
FIG. 2 shows a winding pattern of a wavy coil of the friction member, which is depicted separately for better illustration of the reinforcement member in the drawing.

The illustrations in FIGS. 1, 2 on the one hand and in FIG. 4 on the other hand are reduced to different scales in size.

In detail, coil 1 of the reinforcement member consists of an impregnated yarn or a combination of yarn that optimizes the bursting speed and features a coil-winding ratio of 1.12. Coil 2 of the friction member, wound on coil 1 of the reinforcement member, in contrast, includes tribologically optimized yarns optimized for friction and anti-wear properties and impregnated, with deformation-optimized coil-winding ratio of 4.72.

The reinforcement yarn of coil 1 of the reinforcement member has an end designated with 1a, which, after coil 2 of the friction member is wound on the coil 1, is located near beginning 2a of the friction yarn, from which coil 2 of the friction member is wound.

FIG. 3 is a segment section of a finished double-layered clutch lining depicted schematically with a section area, from whose cutting surfaces yarns of reinforcement member 3 and friction member 4 protrude, which are integrated in the clutch lining. Reinforcement member 3 contains bursting speed optimized coil 1 with yarn 5 of glass. Deformation optimized friction member 4 contains coil 2 alternately with thin yarn 5a of glass and thicker yarn 6 of aramide fibers that are all tribologically optimized. Coils 1 and 2 wound over one another, consist of yarns impregnated with a standard solution pressed together and cured to form a composite, and as depicted, are ground and drilled to form the clutch lining with a front friction facing (not designated).

The composite, not designated in FIG. 3 apart from the coils, consists of dried impregnating solution that contains a thermosetting plastic resin like phenol resin, melamine resin, polyester, an elastomer component like SBR- or NBR unvulcanized rubber, a filler like barium sulfite, porcelain clay, soot, metal sulfide, graphite and - prior to drying the impregnated yarn - a solvent, particularly water.

The clutch disc depicted in FIG. 4 comprises two essentially similar double-layered clutch linings 7, 8, on which parting plane 9 and 10 respectively, of the two layers, namely reinforcement member 3, 3a and friction member 4, 4a, are outlined with dotted lines. In the partition planes, more exactly partial volumes, one of reinforcement members 3, 3a blends into one of friction members 4, 4a, and thus, essentially with the binder and fillers that form a polymer composite and partly also with the yarn, as depicted in FIG. 4. Clutch linings 7, 8 are disposed on respective sides of lining spring segments 11, 12. The clutch linings and lining spring elements are joined together with rivet 13 in a suitable, prior known manner, with friction members 4, 4a, which can come in frictional contact with two outer metal disks (not shown) as counterpart elements, facing outwards.

In the embodiment according to FIG. 4, reinforcement member 3, 3a coil or base structure coils respectively includes 100% glass fiber 5, for high strength, depicted as round sections in the cross-section. The coil of friction member 4, 4a includes 100% glass fiber 5a, depicted as round sections in the cross-section and aramid yarn 6 depicted as star sections. Yarns 5, 5a, and 6 are embedded in a polymer composite with fillers of the same material, which also determines the outer shape of the clutch lining.

In a further embodiment, the bursting speed optimized yarn is selected for the reinforcement member and the bursting speed optimization is promoted by the coil-winding ratio with which the coil of the reinforcement member is wound in a wavy shape after impregnation of the yarn with a suitable impregnating solution for later hot-pressing under regulated temperature and drying, in order to receive the friction member. For the friction member, yarn optimized for the coefficient of friction and anti-wear, thus tribologically optimized, is selected, which, after impregnation with the same impregnating solution and after drying, is wound on the reinforcement member coil to form a wavy shaped coil of the friction member, and having a coil-winding ratio that improves the aforementioned properties of the friction member. Consequently, the coil-winding ratio with which the coil of the friction member is wound in a wavy shape is greater than or equal to the coil-winding ratio with which the coil of the reinforcement member is wound in a wavy shape.

In one embodiment, the invention may be described as follows: In a multilayered, for example, double-layered clutch lining that is manufactured by hot-pressing out of a friction member that forms a friction surface and a reinforcement member, among others, the friction member features a glass component, a filler and a binding resin and the reinforcement member features a coil made of a reinforcement yarn that comprises glass yarn and on which a binder made of a binding resin and an elastomer, particularly unvulcanized rubber adheres.

To provide an improved multilayered, particularly double-layered clutch lining, in view of the technical properties, particularly of little deformation under loading, the friction member contains a coil that comprises an impregnated friction yarn or a friction yarn combination which comprises glass components and features friction and/or anti-wear properties better than those of the reinforcement yarn wound in a wavy shape. The reinforcement yarn, from which a wavy-shaped coil of the reinforcement member is wound, results in a higher bursting speed than the friction yarn or the friction yarn combination, of which the coil of the friction member is wound. The reinforcement yarn of the reinforcement member coil and the friction yarn of the friction member coil are impregnated with a standard impregnating solution, which contains binding resin, elastomer as well as filler, and after drying, prior to winding and subsequent hot-pressing respectively, form a composite with the coils. In a parting plane or a parting volume, the composite with the reinforcement member coil blends into the composite with the friction member coil. A coil-winding ratio with which the wavy-shaped coil of the friction member is wound is greater than or equal to a coil-winding ratio with which the coil of the reinforcement member is wound.

List of Reference Symbols
  1 reinforcement member coil
  1a end of reinforcement yarn
  2 friction member coil
  2a beginning of friction yarn
  3, 3a reinforcement member
  4, 4a friction member
  5, 5a yarn
  6 yarn
  7 first clutch lining
  8 second clutch lining
  9 parting plane
  10 parting plane
  11 lining spring segment
  12 lining spring segment
  13 rivet

What I claim is:

1. A multilayered friction lining, comprising:
  friction member (4, 4a) that forms a friction surface; and,
  reinforcement member (3, 3a), wherein said reinforcement member (3, 3a) is wound of glass fiber reinforcement yarn and said friction member (4, 4a) is wound of aramid friction yarn and glass fiber reinforcement yarn and said friction yarn features friction or anti-wear properties better than that of said reinforcement yarn, wherein said friction member (4, 4a) is wound with a friction coil-winding ratio and said reinforcement member (3, 3a) is wound with a reinforcement coil-winding ratio, wherein said friction coil-winding ratio is greater than said reinforcement coil-winding ratio.

2. The multilayered friction lining according to claim 1 further comprising a double-layered clutch lining.

3. The friction lining according to claim 1, wherein said reinforcement member (3, 3a) features a bursting speed higher than that of said friction member (4, 4a).

4. The friction lining according to claim 1, wherein the friction coil-winding ratio and the reinforcement coil-winding ratio lie within a range between 0.2 and 6.0, respectively.

5. The friction lining according to claim 1, wherein the friction coil-winding ratio lies between 4.5 and 5.0.

6. The friction lining according to claim 1, wherein the friction coil-winding ratio lies between 2.2 and 3.0.

7. The friction lining according to claim 1, wherein the friction coil-winding ratio lies between 2.2 and 6.0.

8. The friction lining according to claim 1, wherein the reinforcement coil-winding ratio lies between 1.0 and 1.5.

9. The friction lining according to claim 1, wherein the reinforcement coil-winding ratio lies between 2.2 and 3.0.

10. The friction lining according to claim 1, wherein the reinforcement coil-winding ratio lies between 0.2 and 5.2.

11. The friction lining according to claim 1, wherein the friction member (4, 4a) and the reinforcement member (3, 3a) are essentially ring-shaped in form and are disposed directly above one another by forming a parting plane and as such form a composite, wherein said friction member (4, 4a) and said reinforcement member (3, 3a) blend into one another in the parting plane area.

12. The friction lining according to claim 1, wherein the friction member (4, 4a) includes coil (2), the reinforcement member (3, 3a) includes coil (1), the reinforcement yarn includes end (1a), and the friction yard includes beginning (2a) and wherein the coil (2) is wound on the coil (1), end (1a) is wound from said coil (1), and beginning (2a) is disposed essentially within the parting plane.

13. A method for producing a multilayered friction lining, comprising:
  winding reinforcement member (3, 3a) out of glass fiber reinforcement yarn;
  winding friction member (4, 4a) out of aramid friction yarn and glass fiber reinforcement yarn; and,
  forming a friction surface on the friction member, wherein said friction yarn features friction and/or anti-wear properties better than those of said reinforcement yarn, wherein said friction member (4, 4a) is wound with a friction coil-winding ratio and said reinforcement member (3, 3a) is wound with a reinforcement coil-winding ratio, and wherein said friction coil-winding ratio is greater than said reinforcement coil-winding ratio.

14. The method of claim 13 wherein the multilayered friction lining further comprises a double-layered clutch lining.

15. The friction lining according to claim 5, wherein the friction coil-winding ratio is 4.72.

16. The friction lining according to claim 6, wherein the friction coil-winding ratio is 2.6.

17. The friction lining according to claim 7, wherein the friction coil-winding ratio is 4.7.

18. The friction lining according to claim 8, wherein the friction coil-winding ratio is 1.12.

19. The friction lining according to claim 9, wherein the friction coil-winding ratio is 2.6.

20. The friction lining according to claim 10, wherein the friction coil-winding ratio is 4.7.

21. A multilayered friction lining, comprising:
  friction member (4, 4a) that forms a friction surface; and, reinforcement member (3, 3*a*), wherein said reinforcement member (3, 3*a*) is wound of reinforcement yarn including a first material and said friction member (4, 4*a*) is wound of reinforcement yarn including the first material and friction yarn including a second material, different from the first material and said friction yarn features friction or anti-wear properties better than of said reinforcement yarn, wherein said friction member (4, 4*a*) is wound with a friction coil-winding ratio and said reinforcement member (3, 3*a*) is wound with a reinforcement coil-winding ratio, wherein said friction coil-winding ratio is greater than said reinforcement coil-winding ratio.

\* \* \* \* \*